(12) United States Patent
Yoon et al.

(10) Patent No.: US 8,590,055 B2
(45) Date of Patent: Nov. 19, 2013

(54) METHOD AND APPARATUS FOR IMPORTING CONTENT HAVING PLURALITY OF PARTS

(75) Inventors: Young-sun Yoon, Suwon-si (KR); Bong-seon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1653 days.

(21) Appl. No.: 11/790,157

(22) Filed: Apr. 24, 2007

(65) Prior Publication Data
US 2007/0209078 A1 Sep. 6, 2007

Related U.S. Application Data (63) Continuation of application No. 11/522,950, filed on Sep. 19, 2006.

(60) Provisional application No. 60/773,341, filed on Feb. 15, 2006.

(30) Foreign Application Priority Data

Apr. 24, 2006 (KR) .......................... 10-2006-0036825

(51) Int. Cl.
*G06F 17/30* (2006.01)
*H04L 29/06* (2006.01)

(52) U.S. Cl.
USPC .......... 726/27; 726/2; 726/3; 726/30; 726/32; 713/154; 713/160; 713/161; 713/162; 713/163; 713/165; 713/171; 380/201; 380/202; 370/389

(58) Field of Classification Search
USPC ..................................... 726/27; 713/160, 171
See application file for complete search history.

(56) References Cited

U.S. PATENT DOCUMENTS

| 5,629,980 A | * | 5/1997 | Stefik et al. ................... 705/54 |
| 6,056,193 A | | 5/2000 | McAuliffe et al. |
| 7,096,268 B1 | | 8/2006 | Shoda et al. |

(Continued)

FOREIGN PATENT DOCUMENTS

| JP | 08-263441 A | 10/1996 |
| JP | 8339637 A | 12/1996 |

(Continued)

OTHER PUBLICATIONS

"Digital Video Broadcasting (DVB); Content Protection & Copy Management", Nov. 30, 2005, pp. 46-55, Digital Video Broadcasting.

(Continued)

*Primary Examiner* — Edan Orgad
*Assistant Examiner* — Jenise Jackson
(74) *Attorney, Agent, or Firm* — Sughrue Mion, PLLC (57) ABSTRACT

A digital content protection apparatus and method for digital rights management (DRM) are provided in which a content file including a plurality of content parts is imported such that a header is included which stores location information required for decoding each of the content parts. Therefore, the number of content parts constituting the content file can be recognized, and a license that is required for the use of each of the content parts can be acquired by analyzing header information without necessitating the parsing of the transport packets of the content file. Accordingly, preparation time for using content can be reduced.

16 Claims, 7 Drawing Sheets

(56) References Cited

U.S. PATENT DOCUMENTS

| | | | |
|---|---|---|---|
| 7,237,108 B2* | 6/2007 | Medvinsky et al. ......... 713/160 |
| 7,434,052 B1 | 10/2008 | Rump |
| 7,840,118 B2 | 11/2010 | Kikuchi et al. |
| 8,135,949 B2 | 3/2012 | McLean et al. |
| 2001/0005358 A1* | 6/2001 | Shiozawa ..................... 370/228 |
| 2002/0016918 A1 | 2/2002 | Tucker et al. |
| 2002/0188570 A1 | 12/2002 | Holliman et al. |
| 2002/0194492 A1 | 12/2002 | Choi et al. |
| 2003/0005135 A1* | 1/2003 | Inoue et al. ................... 709/229 |
| 2003/0226030 A1 | 12/2003 | Hurst et al. |
| 2004/0034786 A1 | 2/2004 | Okamoto et al. |
| 2004/0162846 A1 | 8/2004 | Nakahara et al. |
| 2004/0210762 A1 | 10/2004 | Kawamoto et al. |
| 2005/0075981 A1* | 4/2005 | Kawamoto et al. ............ 705/51 |
| 2005/0108746 A1* | 5/2005 | Futagami et al. ............... 725/31 |
| 2005/0144019 A1* | 6/2005 | Murakami et al. ................ 705/1 |
| 2005/0182727 A1* | 8/2005 | Robert et al. .................... 705/51 |
| 2005/0204037 A1* | 9/2005 | Levy ............................. 709/225 |
| 2005/0251482 A1 | 11/2005 | Stefik et al. |
| 2005/0268343 A1* | 12/2005 | Onoda et al. .................... 726/26 |
| 2005/0289139 A1* | 12/2005 | Takashima et al. ............... 707/5 |
| 2006/0059106 A1* | 3/2006 | Chase et al. ..................... 705/59 |
| 2006/0126845 A1* | 6/2006 | Zheng ........................... 380/270 |
| 2006/0227973 A1* | 10/2006 | Takashima et al. ........... 380/277 |
| 2006/0235956 A1* | 10/2006 | Kawaguchi et al. .......... 709/223 |
| 2006/0287956 A1* | 12/2006 | Higashi et al. .................. 705/51 |
| 2007/0033391 A1* | 2/2007 | Hiramatsu et al. ............ 713/153 |
| 2007/0044159 A1* | 2/2007 | Ishiguro ........................... 726/27 |
| 2007/0079381 A1 | 4/2007 | Hartung et al. |
| 2007/0124252 A1* | 5/2007 | Higashi et al. .................. 705/59 |
| 2007/0130068 A1* | 6/2007 | Kitazato et al. ................. 705/50 |
| 2007/0153315 A1* | 7/2007 | Saeki et al. ................... 358/1.14 |
| 2007/0162400 A1 | 7/2007 | Brew et al. |
| 2007/0174568 A1* | 7/2007 | Kii ................................. 711/162 |
| 2007/0198858 A1 | 8/2007 | Kim et al. |
| 2007/0206799 A1* | 9/2007 | Wingert et al. ................ 380/285 |
| 2008/0137848 A1 | 6/2008 | Kocher et al. |
| 2008/0216177 A1* | 9/2008 | Yokosato et al. ................ 726/26 |
| 2008/0260158 A1* | 10/2008 | Chin et al. ..................... 380/277 |
| 2009/0013348 A1 | 1/2009 | Thomas et al. |
| 2009/0168691 A1* | 7/2009 | Fu et al. .......................... 370/316 |
| 2010/0115628 A1* | 5/2010 | Li et al. ............................ 726/28 |
| 2012/0221853 A1* | 8/2012 | Wingert et al. ............... 713/160 |
| 2013/0046818 A1* | 2/2013 | Klein et al. .................... 709/203 |

FOREIGN PATENT DOCUMENTS

| | | |
|---|---|---|
| JP | 09-160899 A | 6/1997 |
| JP | 09-245438 A | 9/1997 |
| JP | 2000-324329 A | 11/2000 |
| JP | 2000-350181 A | 12/2000 |
| JP | 2001-157172 A | 6/2001 |
| JP | 2001-197417 A | 7/2001 |
| JP | 2001-229281 A | 8/2001 |
| JP | 200215147 A | 1/2002 |
| JP | 200242424 A | 2/2002 |
| JP | 2002-359616 A | 12/2002 |
| JP | 2003-22608 A | 1/2003 |
| JP | 2003-242043 A | 8/2003 |
| JP | 2003-331509 A | 11/2003 |
| JP | 2004-158936 A | 6/2004 |
| JP | 2005513839 A | 5/2005 |
| JP | 2005160032 A | 6/2005 |
| JP | 2005-525010 A | 8/2005 |
| JP | 2005-244946 A | 9/2005 |
| JP | 2007-501562 A | 1/2007 |
| JP | 2007221791 A | 8/2007 |
| JP | 4642023 B2 | 12/2010 |
| KR | 10-2002-0083851 A | 11/2002 |
| KR | 10-2003-0006817 A | 1/2003 |
| KR | 10-2005-0043289 A | 5/2005 |
| KR | 10-2005-0046750 A | 5/2005 |
| TW | 323420 | 12/1997 |
| TW | 390081 | 5/2000 |
| TW | 518889 | 1/2003 |
| WO | 03/090401 A1 | 10/2003 |
| WO | 2004/023717 A2 | 3/2004 |
| WO | 2005/013616 A1 | 2/2005 |
| WO | 2005/038681 A1 | 4/2005 |
| WO | 2005/098631 A1 | 10/2005 |
| WO | 2006/035777 A1 | 4/2006 |

OTHER PUBLICATIONS

Taiwanese Office Action issued on Aug. 26, 2010 in counterpart Taiwanese Patent Application No. 096105732.
Non Final Office Action dated Aug. 30, 2010 in co-pending U.S. Appl. No. 11/522,950.
Final Office Action dated Apr. 1, 2010 in co-pending U.S. Appl. No. 11/522,950.
Non Final Office Action dated Sep. 9, 2009 in co-pending U.S. Appl. No. 11/522,950.
Taiwanese Office Action, dated Feb. 14, 2011, issued in Application No. 96101079.
Communication dated Apr. 28, 2011 from the Korean Intellectual Property Office in counterpart Korean patent application No. 10-2008-0058363.
Notice of Allowance dated Jul. 27, 2011 issued in counterpart Korean Patent Application No. 10-2008-0058363.
Communication, dated Mar. 6, 2012, issued by the Japanese Patent Office in corresponding Japanese Application No. 2007-108359.
Communication, dated Mar. 6, 2012, issued by the Japanese Patent Office in corresponding Japanese Application No. 2007-035314.
Communication, dated Mar. 6, 2012, issued by the Japanese Patent Office in corresponding Japanese Application No. 2007-108360.
Communication dated Oct. 30, 2012 from the Japanese Patent Office in counterpart application No. 2007-035314.
Communication dated Oct. 30, 2012 from the Japanese Patent Office in counterpart application No. 2007-108360.
Taiwanese Office Action dated Jun. 9, 2011 issued in counterpart Taiwanese Patent Application No. 096105732.
US 5,748,741, 05/1998, Johnson et al. (withdrawn)

\* cited by examiner

| | UCI | Import | Bind Type | Usage Rule |
|---|---|---|---|---|
| C C I | COPY FREE | O | Device, Domain | All |
| | COPY ONCE | O | Device | M,S,P |
| | COPY NO MORE | N/A | – | – |
| | COPY NEVER | X | – | – |
| B F | ON | O | Device, Domain | All |
| | OFF | X | – | – |

FIG. 8

METHOD AND APPARATUS FOR IMPORTING CONTENT HAVING PLURALITY OF PARTS

CROSS-REFERENCE TO RELATED APPLICATIONS

This is a continuation of application Ser. No. 11/522,950 filed Sep. 19, 2006, which claims benefit of Provisional Application No. 60/773,341 filed Feb. 15, 2006. The entire disclosures of application Ser. No. 11/522,950 and Provisional Application No. 60/773,341 are considered part of the disclosure of the accompanying continuation application and are hereby incorporated by reference. This application claims priority from Korean Patent Application No. 10-2006-0036825, filed on Apr. 24, 2006, in the Korean Intellectual Property Office, the disclosure of which is also incorporated herein in its entirety by reference.

BACKGROUND OF THE INVENTION

1. Field of the Invention

Apparatuses and methods consistent with the present invention relate to digital content protection, and more particularly, to digital content protection in a digital rights management (DRM) system.

2. Description of the Related Art

With the shift from analog to digital technologies, more digital content has been produced. Whereas copying of analog content is tedious and time-consuming, copying of digital content is comparatively easy and can be performed faster than copying of analog content. In addition, the quality of analog content deteriorates in proportion to the number of copies executed, but the quality of digital content remains constant regardless of the number of copies executed. Accordingly, the demand for digital content protection has increased, and research into the field of content protection is being pursued.

Figure 1:
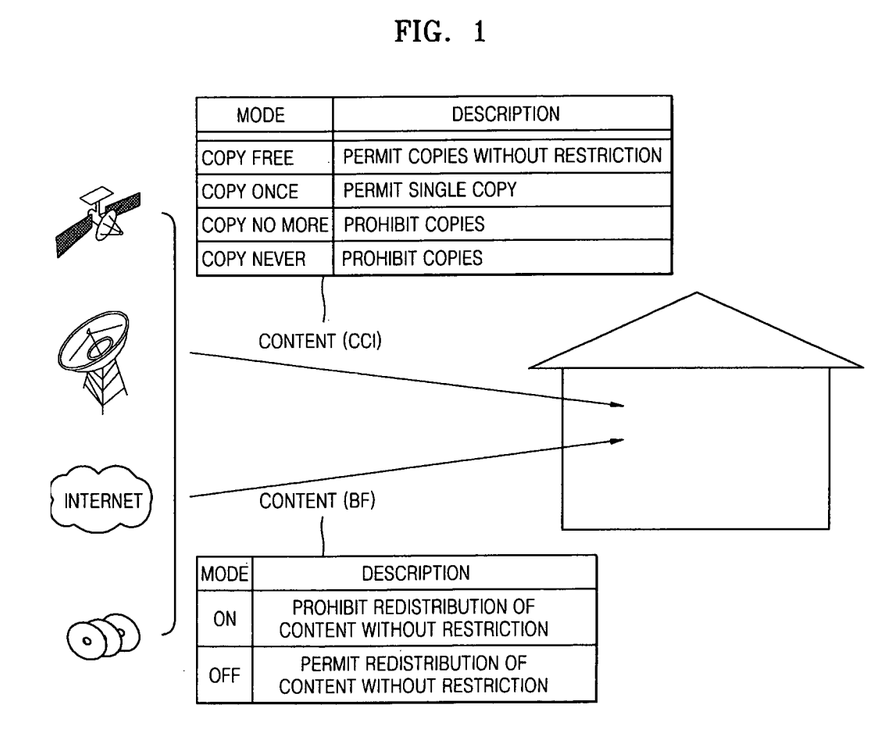
FIG. 1 illustrates a related art digital content protecting environment.

FIG. 1 illustrates a conventional digital content protecting environment.

Referring to FIG. 1, in the conventional digital content protecting environment, a transmission stream is received through various broadcast transmitting channels, and content is protected from being copied by using information included in the transport stream.

One group, the CableLabs consortium, has recommended that content include copy control information (CCI) for controlling a content copy operation. The CCI is two-bit information that restricts the number of copies that can be made of content. The CCI defines a "copy free" state (00), a "copy once" state (01), a "copy no more" state (10), and a "copy never" state (11). The "copy free" state means that there are no restrictions on the number of copies that a user can make. The "copy once" state enables the user to make a single copy only. Once content is copied in the "copy once" state, the content has the "copy no more" state. The "copy never" state prohibits the user from making any copies of the content.

The United States Federal Communications Commission (FCC) has recommended that content be required to include a broadcast flag in order to prevent high-definition (HD) digital content that is broadcasted in the U.S. from being redistributed without restriction. The broadcast flag is one-bit information that indicates whether redistribution of content without restriction is prohibited. The broadcast flag includes a "broadcast flag on" state (1) and a "broadcast flag off" state (0). However, in the "broadcast flag on" state, the content is not allowed to be redistributed without restriction. In the "broadcast flag off" state, the content is allowed to be redistributed without restriction. Usage constraint information may include more pieces of information besides the above-mentioned information.

In order for a user to use a number of types of content pieces received through various transmission channels, the user must obtain a license from a copyright holder whenever using each content piece, which can be an inconvenient process. In this case, the content received through a transmission channel is imported by using a user's DRM system, the content is converted into a content file in accordance with a rule of the user's DRM system, and after a license is issued in accordance with original usage constraint information, the user can use the imported content file in a user's device or any device belonging to a user's domain.

Further, in the event that a single program includes a plurality of content parts, then a plurality of licenses is required. Although the content parts constitute one program, the content parts have independent usage constraint information. Thus, when the content parts are imported and stored as a content file, and when a user wants to use the content file in a device belonging to a user's domain, a transport packet constituting the content file has to be parsed in order to recognize the number of content parts constituting the content file. Then, licenses required for using each of the content parts have to be obtained, thereby resulting in time delay. In particular, the time delay increases even more when a device to use the content receives an imported content file in a streaming manner.

SUMMARY OF THE INVENTION

The present invention provides apparatuses and methods allowing a header, which indicates locations of information on structure of each of content parts and information required for decoding each of the content parts, to be included in an imported content file when content having plurality of usage constraint information is imported to be converted into a single content file.

According to an aspect of the present invention, a method of importing a content file is provided, which comprises encrypting a plurality of content parts, which are included in a first content file to be imported, based on a plurality of pieces of usage constraint information which are included in the first content file, creating a header which indicates location information required to use each of the plurality of content parts which are encrypted, and creating a second content file which includes the header which is created.

In the aforementioned aspect of the present invention, the information required to use each of the plurality of content parts which are encrypted may include at least one of first information which indicates locations of each of the plurality of content parts in the second content file, second information which decrypts each of the plurality of content parts, and a usage rule which is defined for each of the plurality of content parts based on the plurality of usage constraint information.

In addition, the first information may indicate at least one of a start point and an end point of locations within the second content file of each of the plurality of content parts.

In addition, the second information may comprise a content key which decrypts an encryption parameter used in encrypting each of the plurality of content parts.

In addition, each of the plurality of content parts which are encrypted are stored in the second content file and the content header, which is included in the second content file, may include separate license information for each of the plurality of content parts which individually define usage constraints on the plurality of content parts According to another aspect of the present invention, a computer-readable medium is provided having embodied thereon a computer program for executing the method of importing content.

According to another aspect of the present invention, an apparatus for importing a content file is provided, which comprises an encryption unit which encrypts a plurality of content parts included in a first content file to be imported based on a plurality of pieces of usage constraint information which are included in the first content file, a header creating unit which creates a header indicating location information required to use each of the plurality of content parts which are encrypted, and a file creating unit which creates a second content file which includes the header which is created.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

Hereinafter, the present invention will be described in detail by explaining exemplary embodiments of the invention with reference to the attached drawings.

Figure 2:
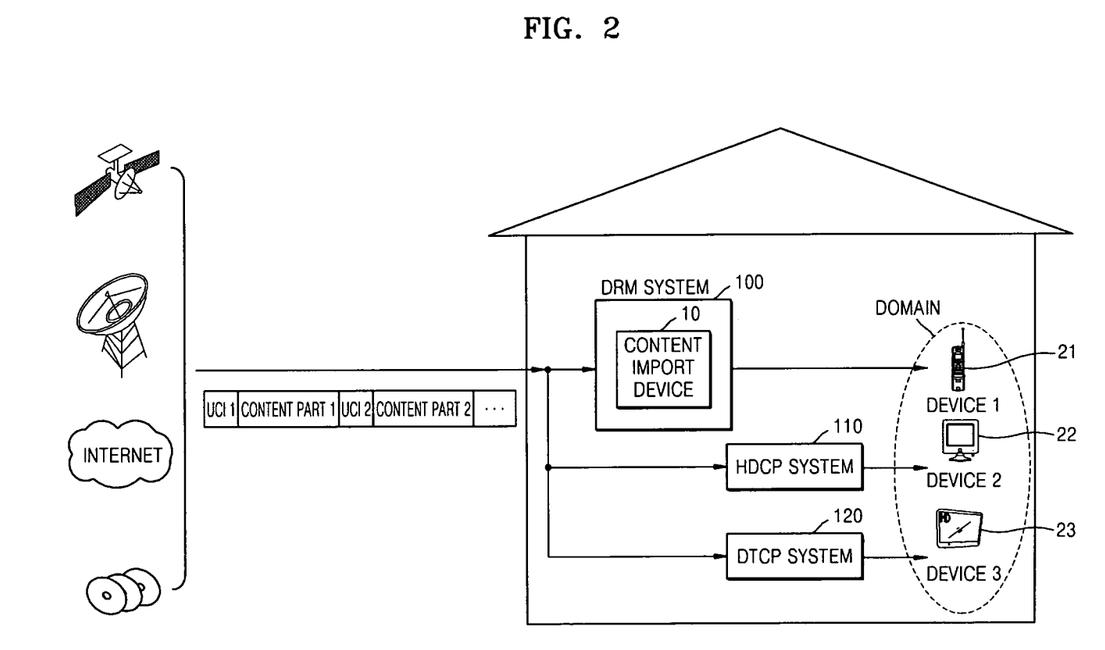
FIG. 2 illustrates a digital content protection environment according to an exemplary embodiment of the present invention.

FIG. 2 illustrates a digital content protection environment according to an exemplary embodiment of the present invention.

Referring to FIG. 2, the digital content protection environment includes various content protection systems and a plurality of devices 21 to 23 which are protected by the content protection systems. Examples of the content protection systems include a digital rights management (DRM) system 100, a high bandwidth digital content protection (HDCP) system 110, and a digital transmission content protection (DTCP) system 120.

The DRM system 100 manages rights of content received from an external domain. The HDCP system 110 prevents copying of content that is output to a digital display through a high bandwidth interface, for example, a digital visual interface (DVI). The DTCP system 120 prevents copying of content that is transmitted through a universal serial bus (USB) in accordance with Institute of Electrical and Electronics Engineers (IEEE) 1394 standard. Furthermore, the content protecting systems may include a conditional access system (CAS) and a content protection recordable media (CPRM) system.

The DRM system 100 includes a content import device 10 which imports content that is protected by using copy control information (CCI) and a broadcast flag, so as to create content that is in accordance with a rule of the DRM system 100. The rule is designed such that security requirements, such as usage restrictions demanded by a content producer and a content provider, are met, and a demand of a content user for using content more freely is satisfied.

Importing refers to a process in which licenses are issued for each of a plurality of content parts that constitute a particular content based on the rule of the DRM system 100, encrypting the content parts, and sending the content parts to a system. Thus, a content file that is not in accordance with the rule of the DRM system 100 may be converted into a content file that is in accordance with the rule of the DRM system. In particular, each of the content parts can be identified by usage constraint information or licenses. As a result, each of the content parts may have independent usage constraint information or licenses. A content file may be a file containing content parts and copy control information or licenses related thereto. One content file may constitute a piece of content, such as a single broadcast program. A content file may be simply referred to as content, as will be understood by those skilled in the art.

The content import device 10 allows a header to include license mapping information and location information which indicate where each of the content parts is located in a content file after importing the content file in a process in which content having a plurality of usage constraint information (i.e., content having a plurality of content parts) is received and then used to create the content file.

When a device belonging to a user's domain uses the content file that is imported in the above manner, the device can first analyze the header so as to read a usage rule of the content file, license, or the like, thereby preparing for a next operation. As a result, time delay can be prevented. This process will be described in greater detail below.

Figure 3:
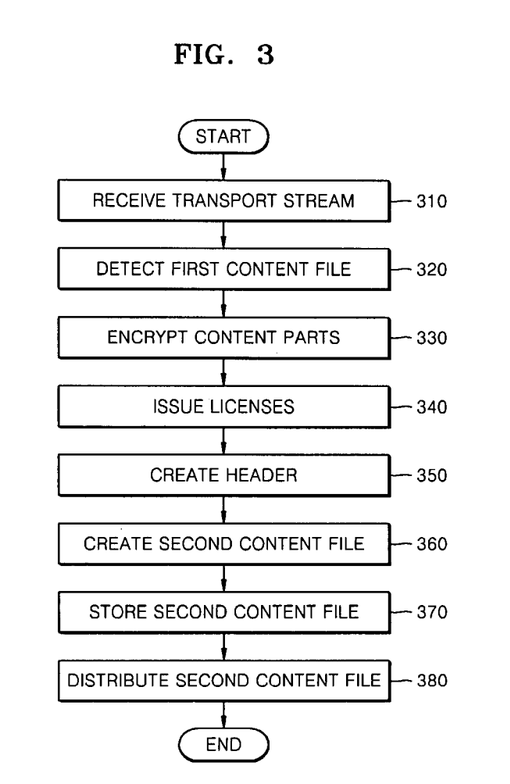
FIG. 3 is a flowchart of a method of importing content according to an exemplary embodiment of the present invention.

FIG. 3 is a flowchart of a method of importing content according to an exemplary embodiment of the present invention.

A content import device receives a transport stream through a transmission channel such as a cable channel or a satellite broadcast channel (operation 310), and detects a first content file constituting one program from the transmission stream. In this case, the first content file includes a plurality of content parts. It is assumed that two or more content parts have independent usage constraint information.

Next, the content parts are encrypted by using a content key (operation 330). An encryption process may use, for example an Advanced Encryption Standard (AES) cipher block chaining (CBC) method, such as AES-128-CBC or a counter (CTR) method, such as AES-128-CTR. Other methods may also be used. In the AES-128-CBC method, an initial vector is used as an encryption parameter. In the AES-128-CTR method, a salt value, which is an integer value of a predetermined length, and a packet serial number are used as the encryption parameter. Here, different content parts use different values. In the present invention, it is assumed that a content file includes transport packets in accordance with the Moving Picture Experts Group (MPEG)-2 standard. The encryption process is carried out for each of the transport packets. A transport packet that indicates an encryption parameter used for encrypting each of the content parts is periodically inserted among transport packets which contain media data such as audio data or video data. This transport packet also includes mapping information that is used to find a license required for decoding a corresponding content part. Hereinafter, information included in this transport packet will be referred to as protection information (PI). A PI packet, that is, a transport packet including the PI, will be described in detail below with reference to FIG. 6.

After the encryption process is completed for each of content parts, licenses are issued for each of the content parts (operation 340). The licenses for each of the content parts include an encrypted content key which has been used for encrypting a corresponding content part. According to a usage range of a content part, a device key or a domain key may be used in the encryption process. When the content part has to be used in a particular device only, the device key is used. Otherwise, the content part is encrypted using the domain key so as to be shared by devices within a domain. Each of the licenses includes mapping information so that the licenses can match corresponding content parts.

Each of the licenses for content parts includes a usage rule for corresponding content. Even if a device can decrypt a corresponding content part, the usage rule included in each of the licenses does not have to be violated. The usage rule is newly defined based on usage constraint information included in a content file before importing. This will be described in detail below with reference to FIG. 4.

Next, a header to be included in the imported content file is created (operation 350). The header includes information that allows a device desiring to use the imported content file to obtain licenses for each of content parts and an encryption parameter in advance. That is, the device can analyze the header information in order to obtain a necessary license and a decoding parameter in advance. Further, licenses for each of the content parts may also be included in the header. The header will be described in detail below with reference to FIG. 7.

After a header is created, a second content file including the header is created (operation 360) and stored in a storage unit (operation 370). The second content file is a content file that is created after the first content file is imported. The second content file is distributed at the request of all devices or a particular device within a user's domain.

Figure 4:
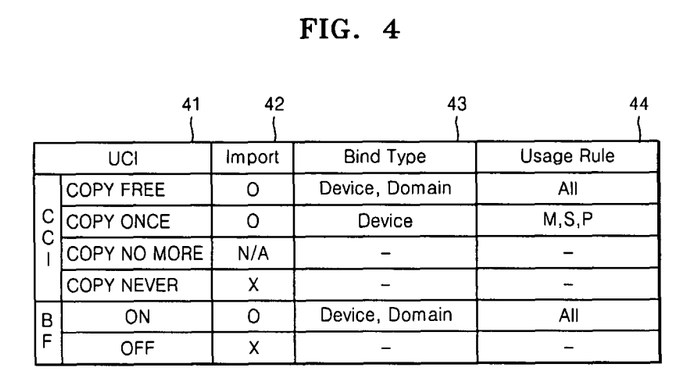
FIG. 4 is a mapping table in which usage constraint information is converted into a usage rule, according to an exemplary embodiment of the present invention.

FIG. 4 is a mapping table in which usage constraint information is converted into a usage rule, according to an exemplary embodiment of the present invention.

Referring to FIG. 4, a mapping table may include a usage constraint information field 41, an import field 42, a bind type field 43, and a usage rule field 44. All content parts constituting a piece of content shown in the mapping table of FIG. 4.

The usage constraint information field 41 stores usage constraint information of a content part. The import field 42 stores a value indicating whether the content part having the usage constraint information stored in the usage constraint information field 41 can be imported or not. The bind type field 43 stores a usage range based on the usage constraint information stored in the usage constraint information field 41. The usage rule field 44 stores a usage rule based on the usage constraint information stored in the usage constraint information field 41 for each usage range stored in the bind type field 43.

A value "all" stored in the usage rule field 44 indicates that all usage types can be used for the content part. A value "M" stored in the usage rule field 44 indicates moving of a content part. Moving of a content part means that a content part that is stored in a first device is stored in a second device at the same time as the content part is deleted from the first device. A value "S" stored in the usage rule field 44 indicates streaming of a content part. Streaming of content part means that a content part stored in a first device is temporarily output to a second device, but the content part is still stored in the first device. A value "P" stored in the usage rule field 44 indicates playing of content part. Playing of content part indicates that a content part is played back by a device.

"Copy free" indicates that a user can copy the content part without restriction. Thus, if the usage constraint information (UCI) is "copy free", then "device, domain" is stored in the bind type field 43, and "all" is stored in the usage rule field 44. "Copy once" indicates that the user can copy the content part only one time. Thus, when the UCI is "copy once", then "device" is stored in the bind type field 43, and "M, S, P" is stored in the usage rule field 44.

In addition to the aforementioned moving, streaming, and playing, examples of the content part may include copying of content parts. Copying of a content part may also be performed, which refers to a content part that is imported and copied. In order for the content import device 10 to import a content part, the content part has to be partially copied. As a result, when the content part imported according to the present exemplary embodiment is copied, two copies are executed. Accordingly, the content import device 10 can import a content part corresponding to "copy once", but cannot allow the content part imported according to the present exemplary embodiment to be copied. For this reason, only "M, S, P" is stored in the usage rule field 44 when the UCI is "copy once".

A "broadcast flag on" indicates that the content part is not allowed to be redistributed without restriction. Thus, in the "broadcast flag on" state, "device, domain" is stored in the bind type field 43, and "all" is stored in the usage rule field 44. Within a domain to which a device belongs, any forms of usage including copying of a content part is subject to a rule that prohibits redistribution of a content part without restriction. A domain range is a particular region recognizable by a user. Therefore, any forms of usage including copying of content part within a domain are in accordance with the rule of prohibiting redistribution of a content part without restriction.

Figure 5:
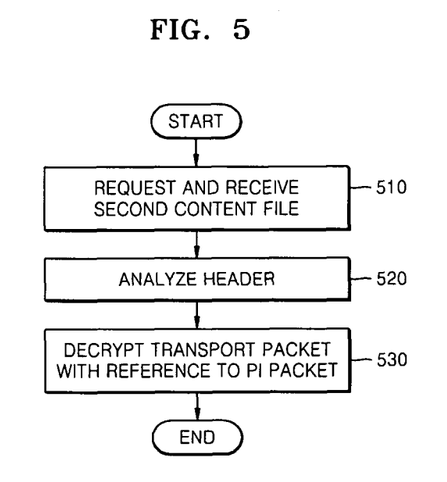
FIG. 5 is a flowchart of a process in which a device within a domain uses imported content according to an exemplary embodiment of the present invention.

FIG. 5 is a flowchart of a process in which a device within a domain uses imported content according to an exemplary embodiment of the present invention.

In the operations of FIG. 3, the second content file is stored in an import device. As described above, the second file is a content file that is created after importing a first content file received from outside the user's domain. With reference to FIG. 5, when a device belonging to a user's domain requests the import device to send the second file, and the second file is received in response thereto (operation 510), then information included in a header is analyzed (operation 520). As described above, by analyzing the header, a license and an encryption parameter can be obtained in advance to decode each of content parts constituting the second content file, without having to parse transport packets of the second content file. That is, the device uses a PI packet included in a content part to be decrypted and obtains mapping information and a decoding parameter for finding a corresponding license.

The corresponding license is found using the mapping information. Finally, each of transport packets constituting the content part is decrypted, thereby obtaining a desired content part.

Figure 6:
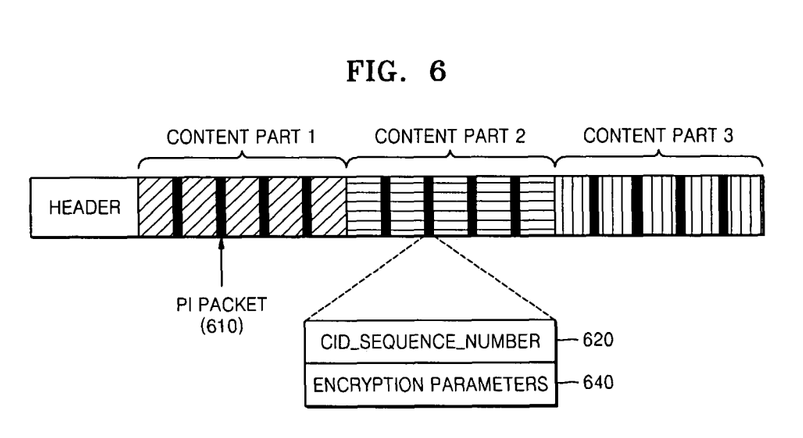
FIG. 6 illustrates a configuration of a content file imported according to an exemplary embodiment of the present invention.

FIG. 6 illustrates a configuration of a content file imported according to an exemplary embodiment of the present invention. It is assumed that the imported content file is composed of three content parts. Referring to FIG. 6, a PI packet 610 periodically including PI is inserted in each content part. The PI packet 610 includes a cid_sequence_number 620 and an encryption_parameter 640.

The cid_sequence_number 620 is defined as mapping information for finding a license that is needed to use each of content parts. That is, the cid_sequence_number 620 is used to identify any one of the three content parts in order to find a license which is created for a content part to be used.

In general, a DRM system assigns a content ID to each piece of content for a content management. Instead of the cid_sequence_number 620, a content ID for a corresponding content may be included in the PI packet so as to be used as mapping information. A content ID format may be determined according to a rule of the DRM system. In some cases, a content ID size may become larger than a maximum data size that can be included in a payload of a MPEG-2 transport packet (i.e., 184-bytes). Therefore, as the mapping information, the PI packet may use the cid_sequence_number 620 which has a smaller size than the content ID and corresponding to each content ID. For example, if the content ID is "urn:marlin:broadcast:1-0:cable:03302006:0001", the cid_sequence_number 620 may be "cable:03302006:0001".

The encryption_parameter 640 is defined as a parameter used in encryption. For example, when the AES-128-CTR method is used for encryption, the PI packet may include serial number information.

Figure 7:
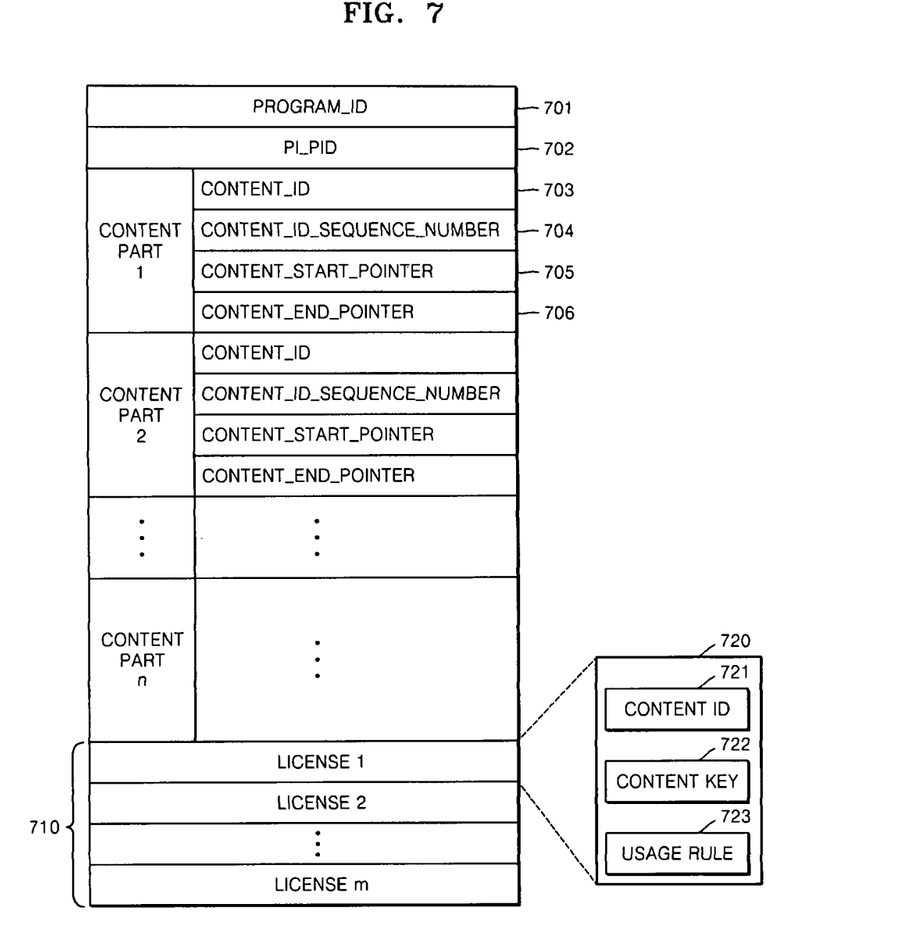
FIG. 7 illustrates a header structure of a content file imported according to an exemplary embodiment of the present invention.

FIG. 7 illustrates a header structure of a content file imported according to an exemplary embodiment of the present invention.

Referring to FIG. 7, a content file header includes a program_id 701 and a pi_pid 702. Each of the content parts may include a content_id 703, a content_id_sequence_number 704, a content_start_pointer 705, and a content_end_pointer 706. Furthermore, the content file header includes licenses 710 corresponding to each of the content parts. Now, the above information pieces will be described in detail.

The program_id 701 indicates a program title. In other words, the program_id 701 identifies one program including n content parts from other programs. The format of the program_id 701 may be determined according to the rule of the DRM system.

The pi_pid 702 is index information for finding a PI packet. Transport packets constituting each of the content parts have a unique packet ID included according to information contained in the packets. That is, each content part has its own license, and may use different encryption methods and encryption parameters. However, since all content parts have a packet ID of a PI packet, which belongs to transport packets included in one content file and includes a PI, the PI packet can be found by analyzing the pi_pid 702.

The content_id 703 is an identifier for identifying the content parts. Each of the content files requires different licenses. Since licenses are included in a content ID of a corresponding content part, the content ID can be used as mapping information which matches each piece of content with corresponding licenses.

As described in FIG. 6, the content_id_sequence_number 704 is defined as mapping information for matching the PI packet with a corresponding license. Since the content_id 703 has a size that is too large to be included in the PI packet, only a portion of the content_id 703 is included in the PI packet, and is also stored in the content file header. That is, after recognizing the content_id_sequence_number 704, a device can identify the content_id 703 of a corresponding content part with reference to the content file header. In addition, the device can find a required license 720 by using the content_id 703 as mapping information.

The content_start_pointer 705 and the content_end_pointer 706 indicate start and end points of each of the content parts, respectively. The content_start_pointer 705 and the content_end_pointer 706 are used to recognize the number of content parts included in an imported content file, without having to parse transport packets one by one, thereby a device which is to use the content can precisely apply licenses acquired for each of the content parts.

In another exemplary embodiment of the present invention, either the content_start_pointer 705 or the content_end_pointer 706 may be omitted.

The license 720 may include a content ID 721, a content key 722, and a usage rule 723. The content ID 721 is defined as mapping information for matching a required license with each of the content parts. For example, if a device desires to use the first content part of FIG. 7, and the device recognizes the content_id 703, then the first content can be found by searching for the license 720 having the same content ID 703. That is, the content_id 703 and the content ID 721 have the same information.

The content key 722 is an encryption key used for encrypting a corresponding content part. The usage rule 723 is created based on the usage constraint information included in a content file before importing. Since this has been already described with reference to FIG. 4, a detailed description thereof will be omitted.

Figure 8:
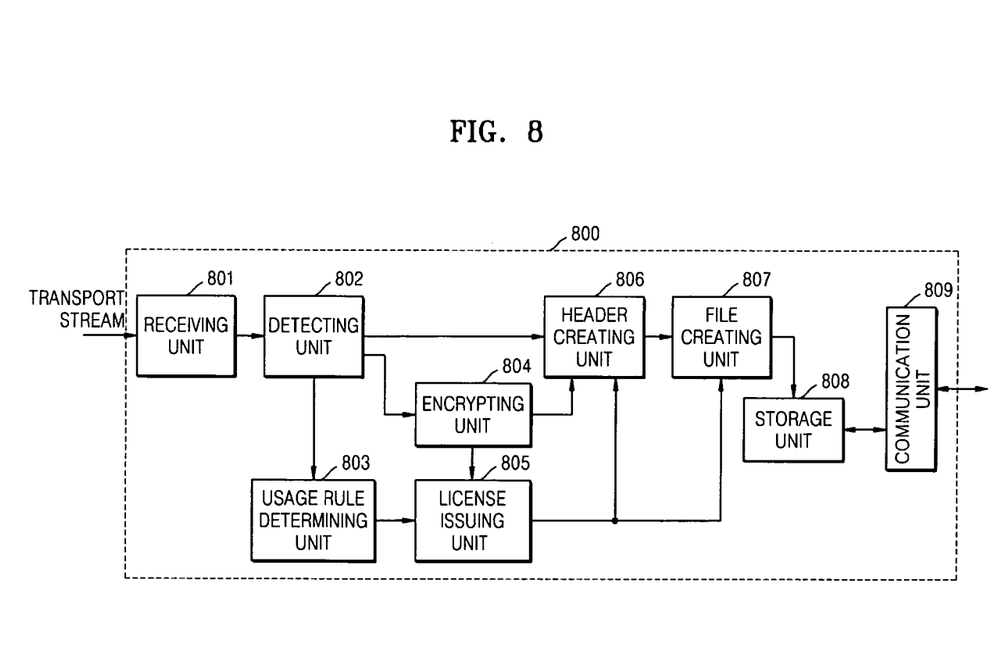
FIG. 8 illustrates a structure of a content import device according to an exemplary embodiment of the present invention.

FIG. 8 illustrates a structure of a content import device according to an exemplary embodiment of the present invention.

Referring to FIG. 8, a content import device 800 may include a receiving unit 801, a detecting unit 802, a usage rule determining unit 803, an encrypting unit 804, a license issuing unit 805, a header creating unit 806, a file creating unit 807, a storage unit 808, and a communication unit 809.

The receiving unit 801 receives a transport stream through various transmission channels from an external domain. The detecting unit 802 detects a content file constituting one program from the received transport stream, and also detects usage constraint information regarding each of content parts. As described above, the usage constraint information may be copy control information, a broadcast flag, or the like.

The usage rule determining unit 803 determines a usage rule for each of the content parts after the content parts are imported based on the usage constraint information detected by the detecting unit 802.

The encrypting unit 804 encrypts the content file (that is, each of content parts included in the content file before importing) detected by the detecting unit 802 by using different content keys according to corresponding usage constraint information. Furthermore, the encrypting unit 804 encrypts the content keys used for encrypting each of the content parts by using a device key or a domain key. If an encrypted content part has to be used in a particular device, a device key of the particular device is used. On the other hand, if the encrypted content part can be shared with all devices within a domain, a domain key is used.

The license issuing unit 805 issues a license for each of the content parts. As described above, a device uses the license in order to use the content parts. Thus, the license includes a usage rule and an encrypted content key for a corresponding content part.

The header creating unit 806 creates a header of an imported content file. The header includes information that allows a device to recognize a structure of the imported content file without having to parse all transport packets, and to acquire a license for each of the content parts in advance, when the device tries to use the imported content file. Further, the header may also include licenses for each of the content files, as shown in FIG. 7.

The file creating unit 807 creates a content file by adding a header into encrypted content parts. Here, the created content file is a content file after importing it. The storage unit 808 stores the imported content file. The communication unit 809 transmits the imported content file when the communication unit 809 receives a request from a device within a user's domain.

According to an aspect of the present invention, when a device belonging to a user's domain uses an imported content file including a plurality of content parts, the number of content parts constituting the content file can be recognized, and a license required for using each of the content parts can be acquired only by analyzing header information without having to parse transport packets of the content file, thereby reducing a preparation time for using content. In addition, when a corresponding content file is received and played back in a streaming manner, a time delay can be reduced when a license has to be newly acquired after the content part changes.

Furthermore, by inserting location information on each of the content parts into a header of an imported content file, a device using each of the content parts can correctly use licenses corresponding to each of the content parts.

The invention can also be embodied as computer readable codes on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A non-transitory computer readable storage medium storing instructions for importing a first content file including a plurality of content parts to a second content file thereon, the instructions when executed by a processor causing the processor to perform step(s) comprising: encrypting at least one of the content parts by using one of a Cipher Block Chaining (CBC) mode or a Counter (CTR) mode wherein an encryption parameter used in the encrypting is included in a protection information (PI) packet;

creating a header for at least one of the content parts, the header including index information to locate the PI packet; and creating the second content file by inserting the content parts and the header; wherein the header includes separate license information for each of the plurality of content parts which individually define usage constraints on the plurality of content parts.

2. The medium of claim 1, wherein the protection information includes mapping information of the content parts and the encryption parameter required to decode the content parts.

3. The medium of claim 1, wherein the content further comprises identification information of a packet containing the protection information.

4. The medium of claim 1, wherein the header includes a content identification (ID) for the content parts, a content key for the content parts, and a usage rule for the content parts.

5. The medium of claim 1, wherein the content is stored in the format of an MPEG-2 transport stream.

6. The medium of claim 2, wherein the mapping information of the content parts is simplified information of the content ID of the content parts.

7. The medium of claim 1, further comprising a license for each of the plurality of content parts and
wherein the header includes the license for each of the plurality of content parts.

8. The medium of claim 2, wherein the mapping information converts usage constraint information into a usage rule.

9. The medium of claim 1, wherein the content file includes transport packets according to Moving Picture Experts Group (MPEG)-2 standard.

10. The medium of claim 1, further comprising:
assigning a content identification (ID) to each piece of the content included in the PI packet.

11. A method of using content including a plurality of content parts, the method comprising: analyzing a header of a content part to obtain index information; locating a protection information (PI) packet by using the index information; and decoding the content part by using one of a Cipher Block Chaining (CBC) mode or a Counter (CTR) mode being included in the protection information packet; wherein the header includes separate license information for each of the plurality of content parts which individually define usage constraints on the plurality of content parts.

12. A method of importing a first content file including a plurality of content parts to a second content file, the method comprising: encrypting at least one of the content parts by using one of a Cipher Block Chaining (CBC) mode or a Counter (CTR) mode; creating a header for at least one of the content parts, the header including index information to locate a protection information (PI) packet; and creating the second content file by inserting the content parts and the header; wherein the header includes separate license information for each of the plurality of content parts which individually define usage constraints on the plurality of content parts.

13. The non-transitory computer readable storage medium according to claim 1, wherein the first content file and the second content file comprise the content part and copy control information.

14. The non-transitory computer readable storage medium according to claim 1, wherein the encryption parameter used in the encrypting is included in the protection information (PI) packet of the at least one content part.

15. The non-transitory computer readable storage medium according to claim 1, wherein the protection information includes mapping information of the content parts to find a license needed to use each of the content parts.

16. The non-transitory computer readable storage medium according to claim 2, wherein the encryption parameter comprises serial number information.

\* \* \* \* \*